United States Patent
Lemke et al.

(10) Patent No.: US 8,892,586 B2
(45) Date of Patent: Nov. 18, 2014

(54) ACCELERATED QUERY OPERATORS FOR HIGH-SPEED, IN-MEMORY ONLINE ANALYTICAL PROCESSING QUERIES AND OPERATIONS

(75) Inventors: Christian Lemke, Heidelberg (DE); Tobias Mindnich, Walldorf (DE); Christoph Weyerhaeuser, Heidelberg (DE); Franz Faerber, Walldorf (DE); Kai-Uwe Sattler, Ilmenau (DE)

(73) Assignee: SAP AG, Walldorf (DE)

( * ) Notice: Subject to any disclaimer, the term of this patent is extended or adjusted under 35 U.S.C. 154(b) by 328 days.

(21) Appl. No.: 13/336,962

(22) Filed: Dec. 23, 2011

(65) Prior Publication Data
US 2013/0166566 A1 Jun. 27, 2013

(51) Int. Cl.
*G06F 17/30* (2006.01)

(52) U.S. Cl.
USPC ........... 707/758; 707/745; 707/E17.051

(58) Field of Classification Search
CPC ............ G06F 17/16; G06F 17/30224; G06F 17/30477; G06F 17/30427; G06F 17/30324; G06F 17/30315; G06F 17/30336; G06F 17/30483; G06F 17/30619; G06F 17/30946
See application file for complete search history.

(56) References Cited

U.S. PATENT DOCUMENTS

| | | | |
|---|---|---|---|
| 5,918,225 A | 6/1999 | White et al. | |
| 6,879,976 B1 * | 4/2005 | Brookler et al. | 1/1 |
| 8,176,088 B2 * | 5/2012 | Rjaibi et al. | 707/802 |
| 8,359,316 B2 * | 1/2013 | Franke et al. | 707/737 |
| 8,417,733 B2 * | 4/2013 | Reynolds | 707/801 |
| 8,583,692 B2 * | 11/2013 | Ganesh et al. | 707/796 |
| 2008/0294863 A1 * | 11/2008 | Faerber et al. | 711/170 |
| 2012/0054225 A1 * | 3/2012 | Marwah et al. | 707/769 |
| 2012/0303633 A1 * | 11/2012 | He et al. | 707/745 |

OTHER PUBLICATIONS

Abadi, Daniel J. et al., "Integrating Compression and Execution in Column-Oriented Database Systems", SIGMOD 2006, Jun. 27-29, 2006.*

Miguel C. Ferreira, "Compression and Query Execution within Column Oriented Databases", Submitted to the Department of Electrical Engineering and Computer Science in partial fulfillment of the requirements for the degree of Master of Engineering in Computer Science and Electrical Engineering at the Massachusetts Institute of Technology, Jun. 2005.

Extended European Search Report dated Mar. 6, 2013 for corresponding European patent application No. 12006263.3.

* cited by examiner

*Primary Examiner* — Michelle Owyang
(74) *Attorney, Agent, or Firm* — Mintz Levin Cohn Ferris Glovsky and Popeo, P.C.

(57) ABSTRACT

An additional data structure can be initialized for a column of compressed data to include a prefix storing, for each block of values in the column, a total number of bits set in previous blocks in the bit vector. A block number can be determined for a target block of the plurality of blocks, for example by checking whether or not a specified row number is located in the prefix. If the specified row number is located in the prefix, the prefix value of the prefix is returned, the most frequently occurring value is returned if a corresponding bit in the bit vector in the specified row number is not located in the prefix, or a position of the specified row in an index vector for the column is returned.

20 Claims, 5 Drawing Sheets

ACCELERATED QUERY OPERATORS FOR HIGH-SPEED, IN-MEMORY ONLINE ANALYTICAL PROCESSING QUERIES AND OPERATIONS

TECHNICAL FIELD

The subject matter described herein relates to improvements in database queries and other operations.

BACKGROUND

The demand for ad-hoc and real-time data analyses by many users in parallel is increasing in the same way that the data quantities to be processed are increasing. To keep pace with the competition in the current economic climate, it is crucial to have the latest information about processes within an organization (e.g. a company) and/or in the market to be able to make the right decisions promptly. Therefore, it is important that the queries generated by analysis tools are processed as quickly as possible. The limiting factor in fulfilling these requirements is typically access to external memory because of the large gap between the access times in the main memory and to external storage. Various approaches to solving this problem can include restricting the data to be read from external storage to a minimum and fastest possible access, avoiding input and output accesses by holding and processing data in the main memory, and parallel processing of queries distributed across a number of suitable server systems (also referred to as "blades").

Management of all data in the main memory can reach an upper limit on practicality relatively quickly, particularly in data-intensive applications, for example including but not limited to business software solutions such as enterprise resource planning (ERP) systems. System memory (e.g. random access memory or RAM) is generally more expensive compared to disk space and can also be limited to an upper bound by the expansion capabilities of a system. As such, suitable compression techniques that both reduce the data volume and allow efficient use of individual tuples and fields are very useful. Reductions in the size of data units that are processed can also provide additional speed benefits via improved utilization of CPU caches and reduction in the amount of data requiring processing.

Online transaction processing (OLTP) and online analytical processing (OLAP) are two potential applications in which high speed data processing may be useful. OLTP is typically used in a company's operational day-to-day business, in which many small and short transactions are executed in parallel and high throughput is required. Databases optimized for write access, such as a typical relational database management system (DBMS) with data organization in rows (row store), can be suitable for very detailed transaction data that must be up-to-date. In contrast, the analysis of operational data over a longer period of time to support decision-making is the more typical focus of OLAP operations. In general, OLAP queries are more complex and the level of detail required for the results is lower. The longer-running transactions associated with OLAP generally access only some of the columns in read mode. As such, a database optimized for read access can be beneficial for support of OLAP processes.

SUMMARY

In one aspect, a method includes accessing a column of compressed data in a table, which includes at least seeking one or more specific values in the column without decompressing the column; deleting all occurrences of a most-frequently occurring value from the column and storing positions for the deleted values in a bit vector; initializing an additional data structure that comprises a prefix that stores a total number of bits set in previous blocks in the bit vector for each block of values in the column; determining a block number for a target block of the plurality of blocks, which includes checking whether or not a specified row number is located in the prefix; and returning a prefix value of the prefix if the specified row number is located in the prefix, returning the most frequently occurring value if a corresponding bit in the bit vector in the specified row number is not located in the prefix, or calculating a position of the specified row in an index vector for the column.

In some variations, one or more of the following features can optionally be included in any feasible combination. The determining of the block number can further optionally include estimating the block number based on a hit position within the index vector. The hit position can optionally include a result of traversing an index vector for the column and counting a number of non-set bits. The data in the column can optionally be divided into a plurality of blocks of a fixed length. Identical consecutive values in the column can optionally be grouped together to form different sized blocks. The grouping can optionally include managing a first index vector comprising start positions of the different sized blocks and a second index vector associated values in the different sized blocks. The managing can optionally include grouping sequential values together by storing only each value and a number of occurrences of that value. A number of compressed blocks and uncompressed blocks can optionally be determined at least in part by counting the bits in the bit vector. A result of a previous hit can optionally be used, for example at least in part by adjusting the result of the previous hit incrementally for an area of the column that has not yet been traversed.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A hardware-based approach to speeding up database operations can include maintaining all or some of the database in system main memory, which continues to become progressively less expensive per unit data storage capacity. In an in-memory database system, data required to respond to queries can be kept in the fast main memory to avoid or at least reduce the occurrence of expensive accesses to external storage. While conventional databases are generally optimized for block-oriented external storage access, in-memory databases can use other data structures that operate directly on memory addresses and can bypass buffer management or page access. Use of in-memory approaches can also be beneficial if particularly short and predictable response times are required for an application. However, the volatility of the main memory generally requires that the data be persisted to external storage. In addition, attributes in databases with fields that contain binary data (BLOBs) and that are not accessed so frequently may optionally be retained in the external storage medium such that requested values are loaded to the memory only if required.

To enable operation with large quantities of data in the fast main memory, it can be necessary to compress the data appropriately. Due to the expense of computer-readable media, the use of compression in databases has been a subject of research basically since the beginning of digital data storage. However, while many previous investigations of potential improvements in database compression have focused primarily on the reduction of storage space and data transfer, a newer field of study involves the increases in speed that can be achieved by the use of compressed data. For example, with compressed data, a system has to compare smaller quantities of data for operations such as joins or selections, and the memory that is additionally available allows it to retain a larger number of frequently-used pages in the cache.

To fulfill the requirements of modern business applications and other data-intensive computing applications, both appropriate optimization and adjustment of query operators and effective compression of the data can be necessary. Possible approaches can be divided into software optimizations and hardware optimizations. With software optimizations, advanced algorithms can be applied on the basis of compressed data structures or index structures. Such algorithms can, based on expert knowledge of a programmer or other specialist, utilize specific properties to accelerate scans, single accesses, aggregations, joins, and other essential database operators.

Appropriate applications of data compression alone can significantly reduce the amount of memory required and the runtime for queries in a data warehouse. In the context of query execution however, achievement of optimum results has been hindered by the need to decompress the compressed data as an intermediate step in the query execution. Such a process can be quite expensive, both from a processing standpoint and in usage of main memory.

To address these and potentially other difficulties with currently available solutions, methods, systems, articles of manufacture, and the like consistent with one or more implementations of the current subject matter can, among other possible advantages, provide software optimizations capable of improving the speed with which database operations, including but not limited to scans, single accesses, aggregations, joins, and the like can be executed upon compressed data.

Efficient algorithms for scan operators, single access operators, aggregation operators, and the like are described. In some implementations, these operators are capable of working directly on the compressed data at least in part due to implementation of special inverted index structures for further optimization. In addition to software optimizations of database operators, hardware optimizations can also be used.

If query execution demands expensive decompression of data or the use of additional memory, the benefit of compression can be substantially reduced or even eliminated. Accordingly, it can be desirable for query operators (and/or other database operators) to work directly on the compressed data for as long as possible and to utilize the specific properties of the respective data structures used. Significant speed improvements can be achieved using one or more implementations of the current subject matter depending on the data distribution and the compression technique used.

The most basic operator in an online analytical processing (OLAP) environment is the scan operator, which allows filtering of data with optionally specified predicates. Unlike in an online transaction processing (OLTP) environment, typically used in a company's operational day-to-day business in which many small and short transactions are executed in parallel and high throughput is required, OLAP environments are more typically focused on analysis of operational data over a longer period of time to support decision-making. An OLTP-optimized database typically emphasizes write access, such as a relational database management system (DBMS) with data organization in rows (row store), are particularly suitable for very detailed transaction data that must be up-to-date. In contrast, a column-store approach, in which data are organized by columns, can be beneficial for an OLAP environment.

The power of the scan operator is of critical significance, particularly in scenarios with mass data and unselective predicates. Another important operator is the single access operator, which enables direct reading of values (or references to a dictionary) in a column for a specific row number.

The speed of both operators can depend on the data structure used for the result (bit vector or vector for integers), the compression technique used, and potentially one or more other factors.

In addition to directly working on the compressed data structures, inverted indexes can be used as described herein to accelerate scans on the block-oriented compression techniques. In contrast to the traditional index structures, a database management system need not know the row number for each value, but can instead store a list of blocks in which the value occurs. During a scan, only these blocks need to be dealt with. The fewer blocks that a value occurs in, the less data that must be check and the greater the gain in speed.

Figure 1A:
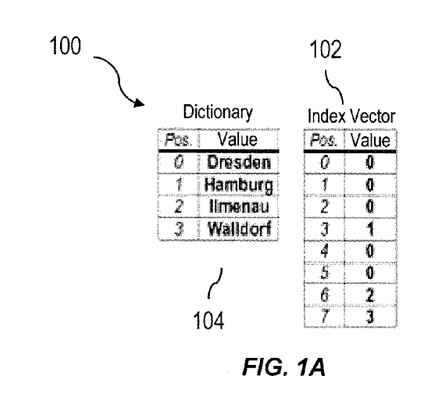
FIG. 1A, FIG. 1B, FIG. 1C, and FIG. 1D show examples of tables illustrating various data compression techniques.

Domain coding can be used as a starting basis for the additional coding techniques described herein. In domain coding, the values in a column are stored in a specific order in a dictionary and then only bit-compressed links (index vectors) are saved. Consequently, encoding with minimal bit lengths of n integers and u different values requires only $n\lceil \log_2 u\rceil$ bits as shown in the table 100 of FIG. 1A, in which each value in the index vector 102 is represented by two bits in the dictionary 104 and the columns displayed in italics exist only logically because they result implicitly from the context. In addition, the use of integers rather than the original values brings benefits in terms of speed because the data volume to be processed is lower and the processors are optimized for this type of data. For example, this means that more data fits in the much faster cache and several values can be processed in parallel with special processor commands according to the SIMD principle (single instruction, multiple data).

Figure 1B:
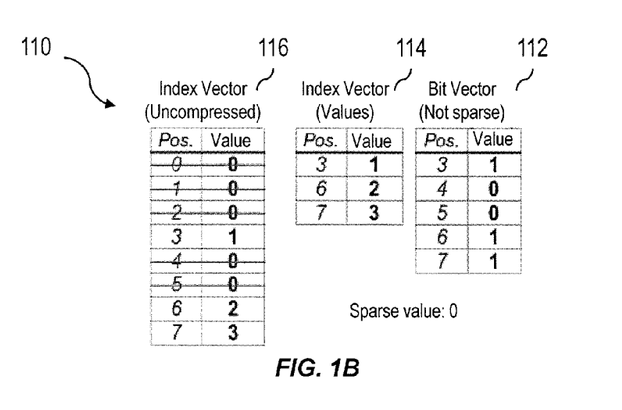

If a value occurs very frequently in the data, sparse coding can be used, for example as illustrated in the table 110 of FIG. 1B. In this approach, all occurrences of the most frequently-occurring value vf can be deleted and the positions stored in a bit vector Bnf 112, whereby a bit is set if the value of the corresponding row is not vf. If there is a prefix, the prefix offset op specifies the first row in which the value differs to the prefix value vp. All remaining values that are different to vf are stored in a bit-compressed index vector Inf 114. Furthermore, it is possible to apply prefix coding for the bit vector, whereby a large prefix p can also bring significant additional savings. With this technique, the amount of memory (in bits) required can be given by $$(n-f)\lceil \log_2 u_{col}\rceil+(n-p)+32$$

In FIG. 1B, the uncompressed index vector 116 of the example data is displayed in comparison with the compressed index vector 114 after the application of sparse coding. Sparse coding can be particularly efficient with regard to memory and speed, if a value occurs in more than approximately 90% of all rows. If the value occurs less frequently, the cost of indirect access through the bit vector generally exceeds the benefits of compression.

To accelerate the counting of the bits set, an additional data structure can be initialized. This additional data structure can include a prefix p storing for each block the total of the bits set in the previous blocks. Furthermore, the result of a previous hit can be used and adjusted incrementally for the area not yet considered. An operator for a single access can first check whether or not the row to be read is located in the prefix. If it is, the operator can return vp. Otherwise, the corresponding bit can be tested in Bnf 112. If this bit is not set, the most frequently-occurring value was queried and of can be returned. If neither case fits, the position in Inf must be calculated by counting the bits in Bnf 112 and the associated value extracted.

Figure 1C:
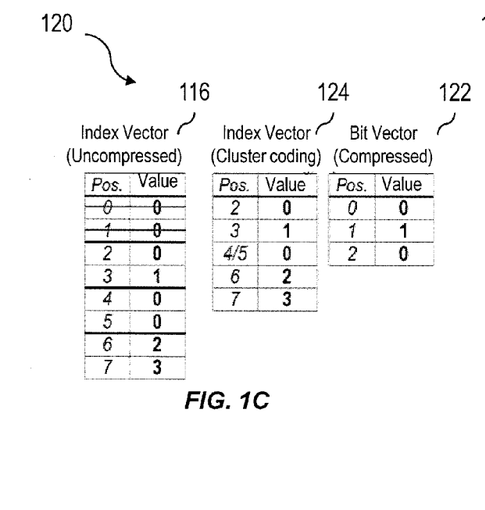

Cluster coding can be used to divide the data into blocks of a fixed length after removing the prefix as shown in the table 120 of FIG. 1C, which includes a block size of two values. These blocks of data may contain as few different values as possible to achieve a good rate of compression. Thus, in the case of cluster coding, only blocks with one different value are compressed by storing only the occurring value. A bit vector 122 records which blocks were compressed, in order to be able to restore the original data. The number of elements can advantageously be a power of two, which can allow a faster method of bit-moving and bit-linking to be used instead of multiplication and modulo.

If there is only one different value in a block, the corresponding value can be written only once in the index vector Iv 124 and it can be noted in the bit vector Bc 122 that the block was compressed. Otherwise, all values in the block can be stored in Iv 124.

If the correct block number is not known due to the possible presence of compressed blocks, it can be first estimated based on the hit position. Based on this information, the number of compressed blocks and uncompressed blocks can be determined by counting the bits in Bc 122 and used for the calculation of the position in Iv 124. As long as this position does not match the hit position, the system has to analyze further blocks and update the information. Once the correct block has been determined, the absolute row number can be calculated from the prefix offset, the number of compressed values, and the number of uncompressed values. If the current block is not compressed, one row can be added to the result. Otherwise, the hit can correspond to more than one row in the uncompressed data.

As with sparse coding, the interim results can be used again and additional auxiliary structures created to accelerate the calculation. To access a single value, a check can be performed to determine whether or not the specified row number r is located in the prefix (op) and if necessary to return the prefix value. If this is not the case, block b can be determined, in which the required value is located. Then, the bit vector Bc 122 can be used to determine the number of compressed blocks (nc) and uncompressed blocks (nu) before b and a temporary index i can be calculated from that. For example, for access to Iv 124: the number of compressed blocks can be calculated as follows: i=op+nc+(nu*1024). If block b is compressed, the value can be read from the index vector using i. Otherwise, the offset o of the value in the block can then be added to the index: o=r−(b*1024).

Figure 1D:
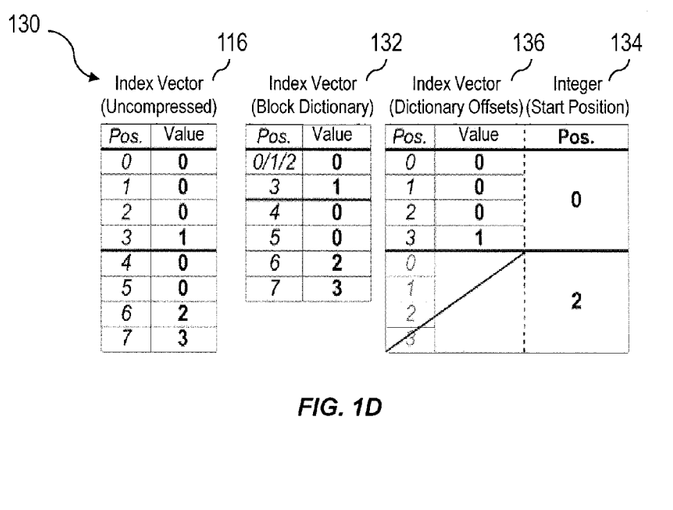

In the case of indirect coding, which can be used if the data blocks contain more than one, but nevertheless very few different values, codes for the values of a column can be assigned with variable and fixed lengths and ignoring the prefix as shown in the table 130 of FIG. 1D. Therefore, each compressed block of data can contain its own mini dictionary. In this case, domain coding can be used for blocks for which this is worthwhile, which introduces another level of indirection and makes a separate mini-dictionary necessary for each block. To reduce the number of dictionaries and thus their storage space, consecutive blocks can use the same dictionary if the new entries do not increase the number of bits required to represent them. In the case of a column with $u_{col}$ different values, a block with k entries and $u_{block}$ different values can be worthwhile if the size of the dictionary and the references is smaller than the uncompressed data (domain coding only):

$$u_{block}\lceil \log_2 u_{col}\rceil+k\lceil \log_2 u_{block}\rceil<k\lceil \log_2 u_{col}\rceil$$

In the case of uncompressed blocks, all values can be stored, even if they occur more than once. The data structures used in the implementation are illustrated on the basis of an example in FIG. 1D, whereby one block consists of four values and the compressed elements are displayed above the horizontal cutoff lines. The dictionaries and the uncompressed data can be stored in the block dictionary index vector 132 and addressed on a block-by-block basis using an integer start position 134. Compressed blocks can also have a dictionary offsets index vector 136 that contains the references to the associated block dictionary 132.

The references to the local dictionary for each block generally have a fixed length. The references to the global dictionary for the column can be stored without additional indirection for uncompressed blocks with too many different values. The references to the global dictionary can have a fixed length. Therefore they can be stored in a bit-compressed index vector (Iv). Furthermore, information about the start position (s) of the local dictionary in Iv and the local references (O) for each block are stored in a vector Vbi.

Once the predicate P has been checked for each reference to the global dictionary, the row numbers are reconstructed for all hits. To do this, first the associated block b can be determined based on the start position s. The references O to the local dictionary can be read from Vbi. If the block is not compressed and does not contain any local references, then the absolute row number can be calculated based on the position in the block (hit position—start position). Otherwise, the value for a reference to the local dictionary can be determined and all local references to it can be checked. The absolute row number can be calculated for each match using the associated position j.

To extract the value for a given row number r, first the corresponding block b can be determined and its start position s can be read from Vbi. If this block is not compressed, the index i for access to Iv can be calculated as follows: i=r−(b*1024)+s. Otherwise, the value of the corresponding local reference can be determined and added to the start position to obtain the correct index. The position of the local reference results from the subtraction of the number of values in the previous blocks (b*1024) from the row number.

In run-length coding, identical consecutive values can be grouped together to blocks of different sizes. To do this, two index vectors, contain the start positions of the blocks (Is) as well as the associated values (Iv), can be managed such that sequential values are grouped together by storing only a value and the number of occurrences. For faster access, an inverted index can optionally be created. The inverted index can store the entry points to the index vectors for each value. With this compression technique, optimum results can be achieved on data for which the number of value changes is not much larger than the number of different values. The less frequently that the individual values occur consecutively, the larger the index vectors used can become, thereby resulting in a slower the scan speed.

At the start of a scan the system checks whether or not the optional index exists. If it does exist, this optional index can be used to determine the blocks to be considered. The start and end row numbers can be read from Is for each block and the corresponding range can be inserted in the results. If the inverted index structure does not exist, the predicate must be tested against all values in Iv to determine the blocks.

To access a single value, a binary search for the requested row number can be performed on the index vector Is. As soon as the correct block has been found, the associated value can be read from Iv and returned.

Implementations of the current subject matter can provide optimization options for aggregation in addition to those discussed above for scan operators. The grouping and aggregation on a compressed column can be implemented as part of the scan and can thus enable filtering using predicates without additional effort. Furthermore, some aggregation functions, such as MIN and MAX, can be analyzed using only the dictionary without a scan. In further implementations, the COUNT aggregation of a column for various compression techniques can also be calculated. The calculation of a total can be done in the same way and can require an additional access to the dictionary for a column after counting the frequencies to multiply the actual value with the number for each group. To store the number of values per group, an array G can be used that can be accessed using dictionary references (values in the index vectors).

In the case of sparse coding, the occurrences of the most frequently-occurring value of are flagged by the deletion of a bits in the bit vector Bnf 112 and the remaining values written to the index vector Inf 114. For a prefix of size op with the value vp, the optimized algorithm for a COUNT aggregation taking into account the predicate P can be constructed as follows.

First, the prefix can be checked and the frequency of the prefix value can be copied if necessary. Then, the number of occurrences of the most frequently-occurring value can be determined in the same way, by counting the bits not set. Finally, the index vector Inf 114 can be traversed and the associated frequency incremented for each hit.

Due to the application of cluster coding, the data can be split into blocks of a fixed length, whereby for blocks with one different value, this value is stored only once in the index vector and noted accordingly in a bit vector. During aggregation, the index vector and the bit vector can be traversed and in the event of a compressed block (bit is set), the frequency of the associated value can be increased by 1024.

In the case of indirect coding, the system must iterate over the vector containing the block information and, depending on the presence of offsets, look up entries in the index vector. In contrast, the aggregation can have greater potential for optimization when using run-length coding. In this case, the frequency of each value can be calculated simply using the difference in the number of the start rows, without processing lots of data.

Figure 2:
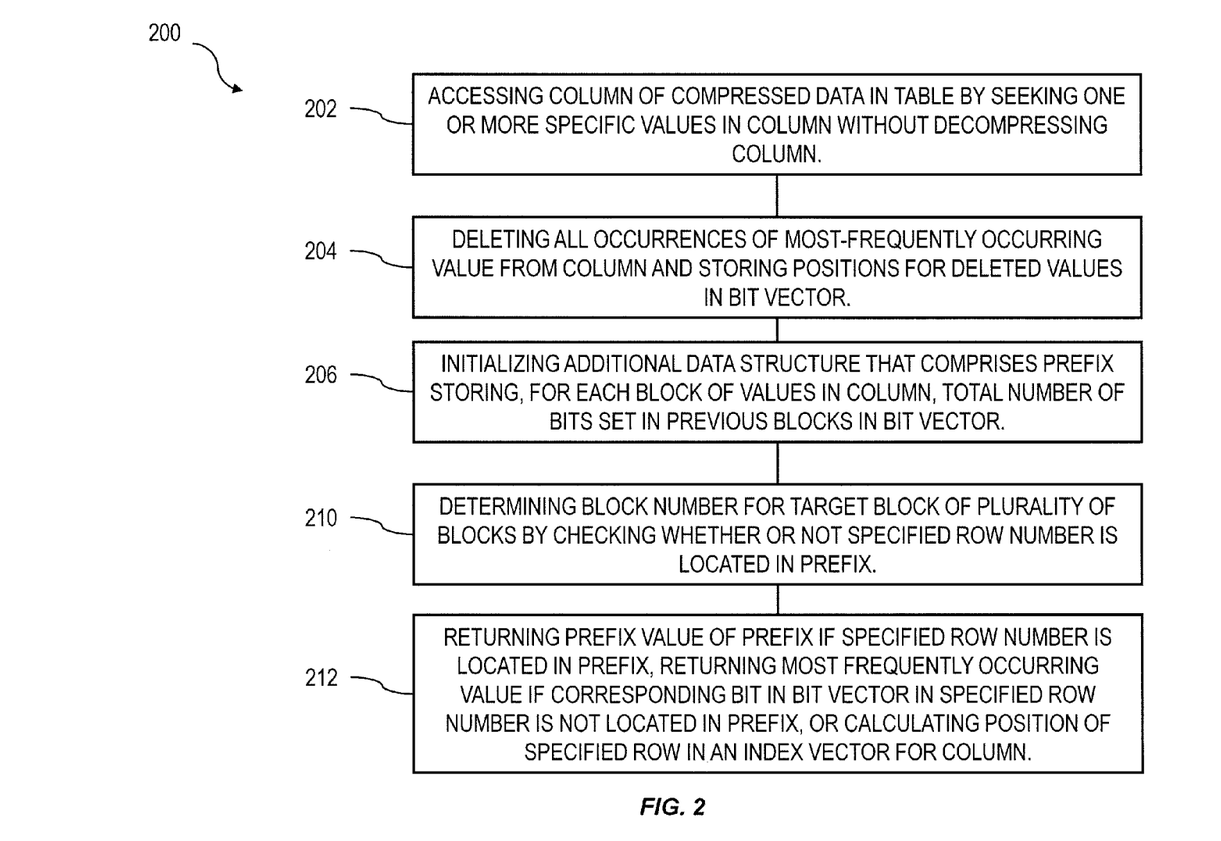
FIG. 2 is a process flow diagram illustrating aspects of a method having one or more features consistent with implementations of the current subject matter.

FIG. 2 shows a process flow chart 200 illustrating method features, one or more of which can be included in implementations of the current subject matter. At 202, a column of compressed data is accessed in a table. The accessing can include seeking one or more specific values in the column without decompressing the column. All occurrences of a most-frequently occurring value can be deleted from the column at 204 and positions for the deleted values can be stored in a bit vector. An additional data structure can be initialized at 206 to include a prefix storing, for each block of values in the column, a total number of bits set in previous blocks in the bit vector. Each compressed block of data can contain its own mini dictionary. A block number for a target block of the plurality of blocks can be determined at 210, for example by checking whether or not a specified row number is located in the prefix. At 212, a prefix value of the prefix is returned as the result if the specified row number is located in the prefix, or the most frequently occurring value is returned as the result if a corresponding bit in the bit vector in the specified row number is not located in the prefix, or a position of the specified row in an index vector for the column is calculated and returned as the result.

Figure 3:
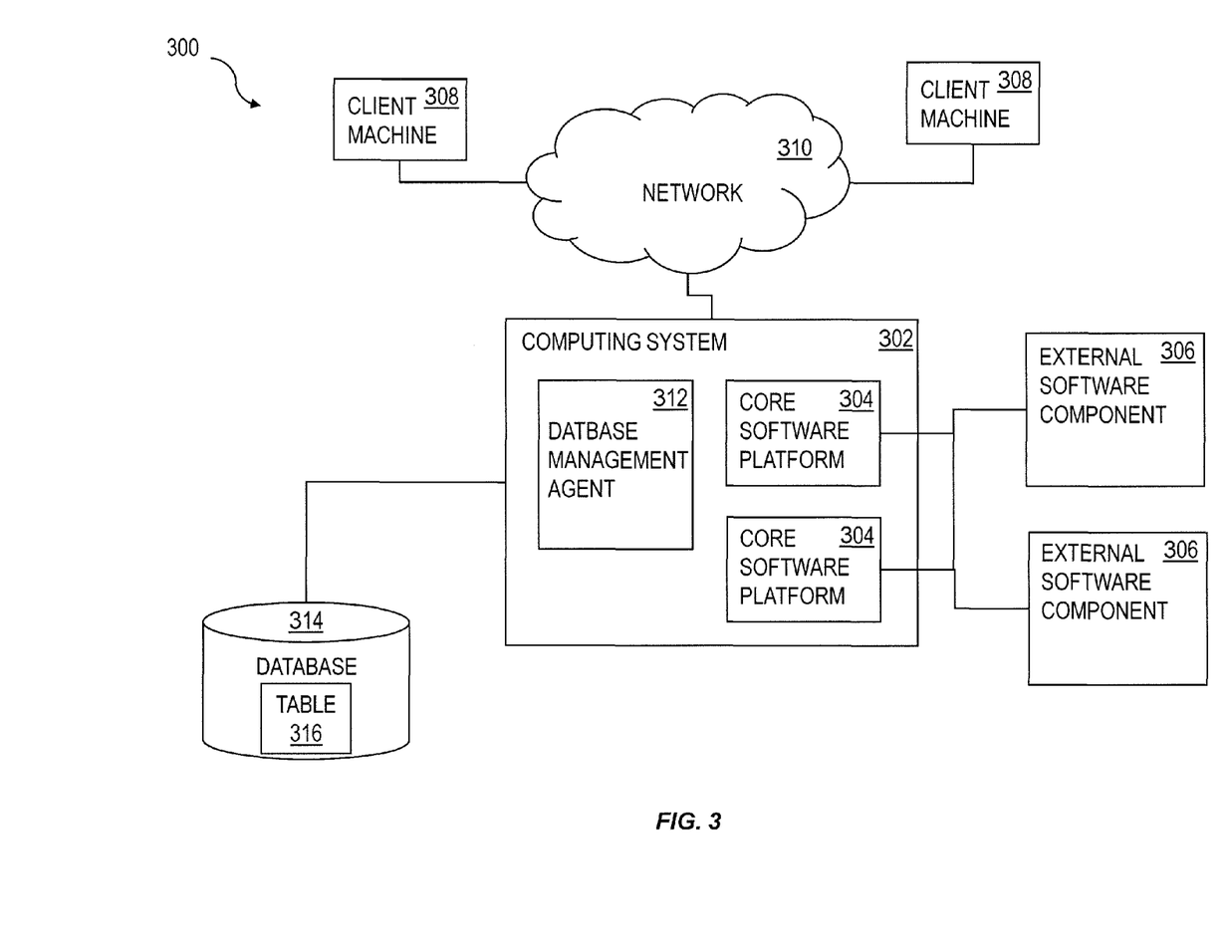
FIG. 3 is a diagram illustrating features of a business software system architecture consistent with at least some implementations of the current subject matter.

FIG. 3 shows a diagram of a system that can implement one or more features of the current subject matter. A computing system 302 can include one or more core software platform modules 304 providing one or more features of a business software system or other software that includes database management features. The computing system can also aggregate or otherwise provide a gateway via which users can access functionality provided by one or more external software components 306. One or more client machines 308 can access the computing system, either via a direct connection, a local terminal, or over a network 310 (e.g. a local area network, a wide area network, a wireless network, the Internet, or the like).

A database management agent 312 or other comparable functionality can access a database 314 that includes at least one table 316, which can in turn include at least one column. The database management agent 312 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

One potential use for various implementations of the current subject matter can include handling of the database demands of an enterprise resource planning (ERP) system, other business software architecture, or other data-intensive computing application or software architecture. Such applications can, in some examples, be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. The diagram of FIG. 1 depicts an example of such a system.

Figure 4:
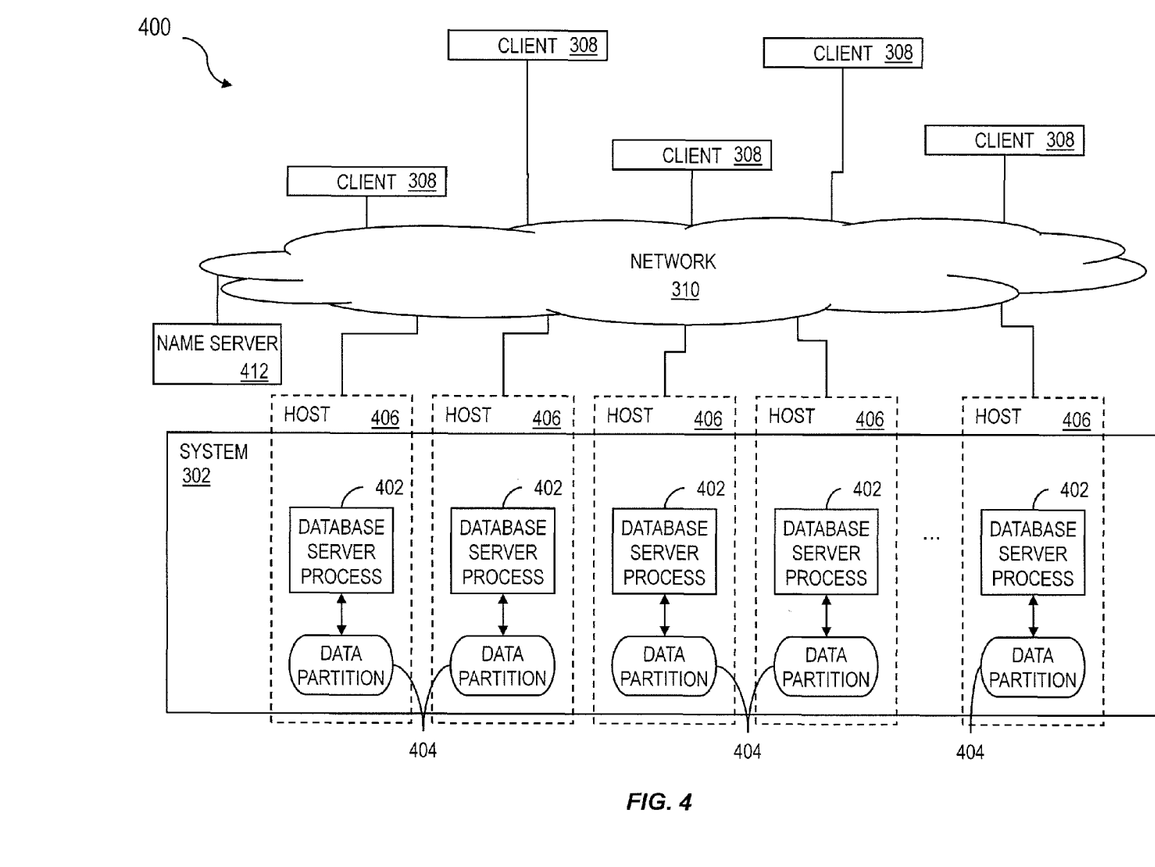
FIG. 4 is a diagram illustrating features of a database management system architecture consistent with at least some implementations of the current subject matter.

Alternatively or in addition, tables or ranges within tables can be assigned to different database partitions that are assigned to different hosts, for example data distribution and/or scalability reasons. FIG. 4 shows an example of an enterprise resource system architecture 400 consistent with an implementation that includes data distribution for scalability reasons. Such a configuration can be used for large, on-premise or stand-alone systems with high performance requirements. Each data server process 402 and its associated data partition 404 can be assigned to a discrete host 406. A host 406 can be a standalone machine with one or more physical processors or a virtual machine on a larger system 302 as depicted in FIG. 4. A central component, labeled as a name server 412 in FIG. 4, knows the topology of the system and how data is distributed. In a system with data distribution, the name server knows which tables or partitions of tables are located on which data server process 402. One or more clients 414 (e.g. client machines 308) can access the name server 412, either via a direct connection or over a network 416.

In a data distribution scenario, the partitioning can be done table wise or also by splitting tables. With table wise partitioning, the name server assigns new tables to a database server process 402 based on the current distribution of tables (number of tables assigned to each database server process 402). Then data for this table will reside only on that database server process 402. It is also possible to specify that a table is split over multiple database server processes 402. The name server 412 can optionally partition the table based on a size estimation specified by the application. When records are inserted into a split table, the records can be distributed to other database server processes 402 based on name server information.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 5:
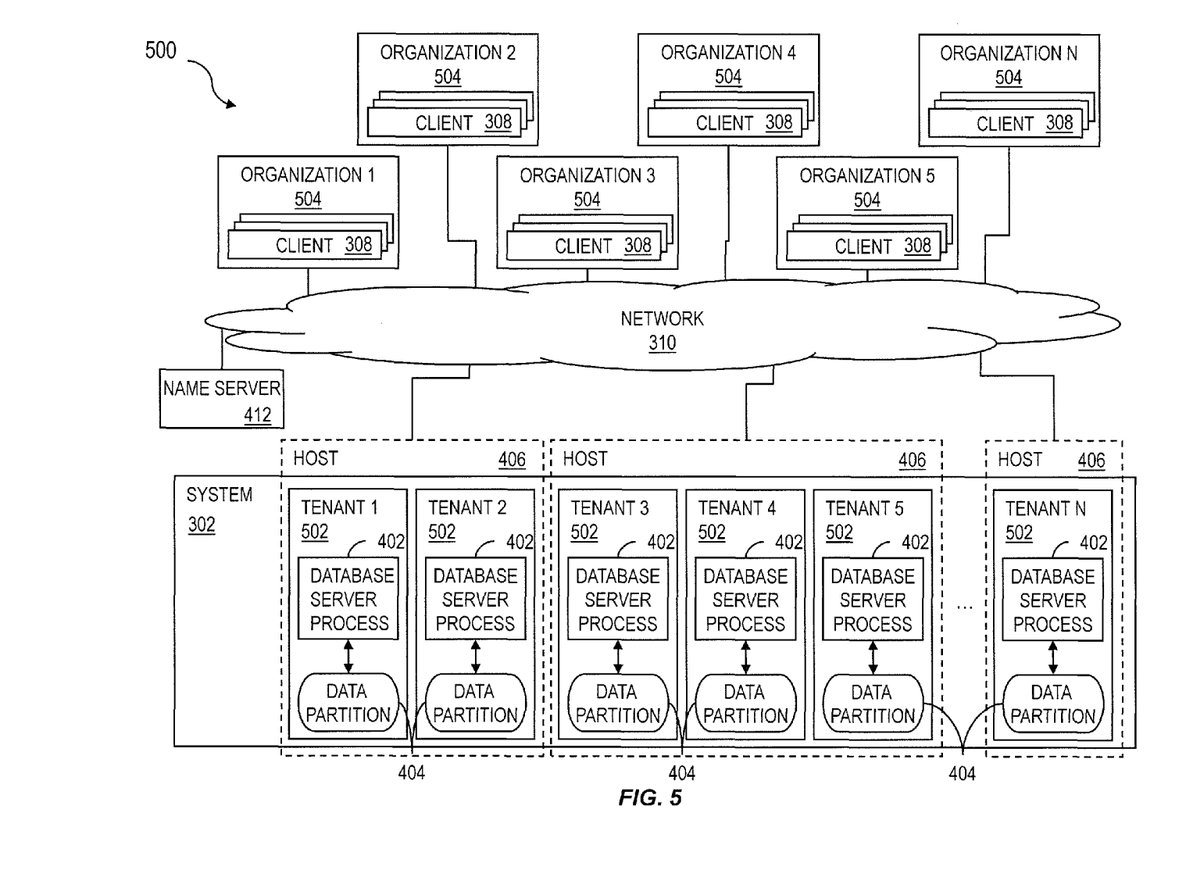
FIG. 5 is a diagram illustrating features of another database management system architecture consistent with at least some implementations of the current subject matter.

Data partitioning consistent with implementations of the current subject matter can also be used in a multi-tenancy environment as illustrated in the system architecture 500 of FIG. 5. Multiple tenants 502, each isolated from one another and available to be accessed by clients 414 within a separate organization 504 of a plurality of organizations via a network 416, can be hosted by a same host 406, which can be a virtual machine on a larger system 302 as shown in FIG. 5 or a separate system that includes one or more physical processors. Tenants 502 can also optionally be distributed across multiple database server processes 402 on more than one host 406. In this manner, tables or ranges within tables are assigned to different database server processes 402 that are assigned to different hosts 406 for scalability reasons. One or more tenants 502 can alternatively be served by a single database server process 402 accessing a data partition 404 (or multiple data partitions 404) for the respective tenant 502 that is isolated from other tenants 502.

To provide for customization of the business process for each of multiple organizations supported by a single software delivery architecture, the data and data objects stored by a database management system can include three types of content: core software platform content (e.g. a standard definition of a business process), system content, and tenant content. Core software platform content includes content that represents core functionality and is not modifiable by a tenant. System content can in some examples be created by the runtime of the core software platform and can include core data objects that store concrete data associated with specific instances of a given business process and that are modifiable with data provided by each tenant. The data retained in these data objects are tenant-specific: for example, each tenant of the group of tenants can store information about its own inventory, sales order, etc. Tenant content for isolated to each tenant of the group of tenants includes data objects or extensions to other data objects that are customized for one specific tenant of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content and system content and tenant content of a specific tenant of the group of tenants are accessed to provide the business process definition and/or the status information relating to a specific instance of the business process according to customizations and business data of that tenant such that each tenant of the group of tenants is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

accessing a column of compressed data in a table, wherein the accessing comprises seeking one or more specific values in the column without decompressing the column, wherein the compressed data comprises values from a dictionary, wherein the values comprise the one or more specific values, wherein each of the values is encoded with a corresponding bit value in an index vector;

deleting all occurrences of a most-frequently occurring value from the column and storing positions for the deleted occurrences in a bit vector, wherein the bit vector comprises a bit set when a value of a corresponding row is not the most-frequently occurring value;

initializing an additional data structure that comprises a prefix, wherein the prefix comprises storing, for each block of a plurality of blocks of values in the column, a total number of bits set in the bit vector for previous blocks of the plurality of blocks that are previous to that block;

determining, in response to the accessing, a block number for a target block of the plurality of blocks, wherein the target block contains the one or more specific values, wherein the determining comprises checking whether or not a specified row number corresponding to the block number to be accessed is located in the prefix; and if the specified row number is located in the prefix, returning a prefix value of the prefix, and
if the specified row number is not located in the prefix,
querying the most frequently occurring value and returning the most frequently occurring value when a corresponding bit for the specified row number is not set in the bit vector, and
calculating a position of the specified row number in the index vector for the column by counting bits in the bit vector and returning the position when the corresponding bit for the specified row number is set in the bit vector.

2. A computer program product as in claim 1, wherein the determining of the block number further comprises estimating the block number based on a hit position within the index vector, wherein the hit position comprises a result of traversing an index vector for the column and counting a number of non-set bits.

3. A computer program product as in claim 1, wherein the operations further comprise dividing the values in the column into the plurality of blocks having a fixed length.

4. A computer program product as in claim 1, wherein the operations further comprise grouping identical consecutive values in the column together to form different sized blocks, wherein the grouping comprises managing a first index vector comprising start positions of the different sized blocks and a second index vector associated values in the different sized blocks, wherein the managing comprises grouping sequential values together by storing only each value and a number of occurrences of that value.

5. A computer program product as in claim 1, wherein the operations further comprise determining a number of compressed blocks and uncompressed blocks at least in part by counting the bits in the bit vector.

6. A computer program product as in claim 1, wherein the operations further comprise using a result of a previous hit, wherein the using comprises adjusting the result of the previous hit incrementally for an area of the column that has not yet been traversed.

7. A system comprising:
a computer hardware configured to perform operations comprising:
accessing a column of compressed data in a table, wherein the accessing comprises seeking one or more specific values in the column without decompressing the column, wherein the compressed data comprises values from a dictionary, wherein the values comprise the one or more specific values, wherein each of the values is encoded with a corresponding bit value in an index vector;
deleting all occurrences of a most-frequently occurring value from the column and storing positions for the deleted occurrences in a bit vector, wherein the bit vector comprises a bit set when a value of a corresponding row is not the most-frequently occurring value;
initializing an additional data structure that comprises a prefix, wherein the prefix comprises storing, for each block of a plurality of blocks of values in the column, a total number of bits set in the bit vector for previous blocks of the plurality of blocks that are previous to that block;
determining, in response to the accessing, a block number for a target block of the plurality of blocks, wherein the target block contains the one or more specific values, wherein the determining comprises checking whether or not a specified row number corresponding to the block number to be accessed is located in the prefix; and
if the specified row number is located in the prefix,
returning a prefix value of the prefix, and
if the specified row number is not located in the prefix,
querying the most frequently occurring value and returning the most frequently occurring value when a corresponding bit for the specified row number is not set in the bit vector, and
calculating a position of the specified row number in the index vector for the column by counting bits in the bit vector and returning the position when the corresponding bit for the specified row number is set in the bit vector.

8. A system as in claim 7, wherein the determining of the block number further comprises estimating the block number based on a hit position within the index vector, wherein the hit position comprises a result of traversing an index vector for the column and counting a number of non-set bits.

9. A system as in claim 7, wherein the operations further comprise dividing the values in the column into the plurality of blocks having a fixed length.

10. A system as in claim 7, wherein the operations further comprise grouping identical consecutive values in the column together to form different sized blocks, wherein the grouping comprises managing a first index vector comprising start positions of the different sized blocks and a second index vector associated values in the different sized blocks, wherein the managing comprises grouping sequential values together by storing only each value and a number of occurrences of that value.

11. A system as in claim 7, wherein the operations further comprise determining a number of compressed blocks and uncompressed blocks at least in part by counting the bits in the bit vector.

12. A system as in claim 7, wherein the operations further comprise using a result of a previous hit, wherein the using comprises adjusting the result of the previous hit incrementally for an area of the column that has not yet been traversed.

13. A system as in claim 7, wherein the computer hardware comprises:
a programmable processor; and
a machine-readable medium storing instructions that, when executed by the programmable processor, cause the at least one programmable processor to perform at least some of the operations.

14. A computer-implemented method comprising:
accessing a column of compressed data in a table, wherein the accessing comprises seeking one or more specific values in the column without decompressing the column, wherein the compressed data comprises values from a dictionary, wherein the values comprise the one or more specific values, wherein each of the values is encoded with a corresponding bit value in an index vector;
deleting all occurrences of a most-frequently occurring value from the column and storing positions for the deleted occurrences in a bit vector, wherein the bit vector comprises a bit set when a value of a corresponding row is not the most-frequently occurring value;
initializing an additional data structure that comprises a prefix, wherein the prefix comprises storing, for each block of a plurality of blocks of values in the column, a total number of bits set in the bit vector for previous blocks of the plurality of blocks that are previous to that block;
determining, in response to the accessing, a block number for a target block of the plurality of blocks, wherein the target block contains the one or more specific values, wherein the determining comprises checking whether or not a specified row number corresponding to the block number to be accessed is located in the prefix; and if the specified row number is located in the prefix, returning a prefix value of the prefix, and if the specified row number is not located in the prefix,
querying the most frequently occurring value and returning the most frequently occurring value when a corresponding bit for the specified row number is not set in the bit vector, and calculating a position of the specified row number in the index vector for the column by counting bits in the bit vector and returning the position when the corresponding bit for the specified row number is set in the bit vector.

15. A computer-implemented method as in claim 14, wherein the determining of the block number further comprises estimating the block number based on a hit position within the index vector, wherein the hit position comprises a result of traversing an index vector for the column and counting a number of non-set bits.

16. A computer-implemented method as in claim 14, further comprising dividing the values in the column into the plurality of blocks having a fixed length.

17. A computer-implemented method as in claim 14, further comprising grouping identical consecutive values in the column together to form different sized blocks, wherein the grouping comprises managing a first index vector comprising start positions of the different sized blocks and a second index vector associated values in the different sized blocks, wherein the managing comprises grouping sequential values together by storing only each value and a number of occurrences of that value.

18. A computer-implemented method as in claim 14, wherein the operations further comprise determining a number of compressed blocks and uncompressed blocks at least in part by counting the bits in the bit vector.

19. A computer-implemented method as in claim 14, further comprising using a result of a previous hit, wherein the using comprises adjusting the result of the previous hit incrementally for an area of the column that has not yet been traversed.

20. A computer-implemented method as in claim 14, wherein at least one of the accessing, the deleting, the initializing, the determining, and the returning is performed by at least one programmable processor.

* * * * *